Sept. 23, 1958
E. E. BEDELL
2,853,358
FACSIMILE STYLUS BELT AND STYLUS HOLDER
Filed April 11, 1956
2 Sheets-Sheet 1
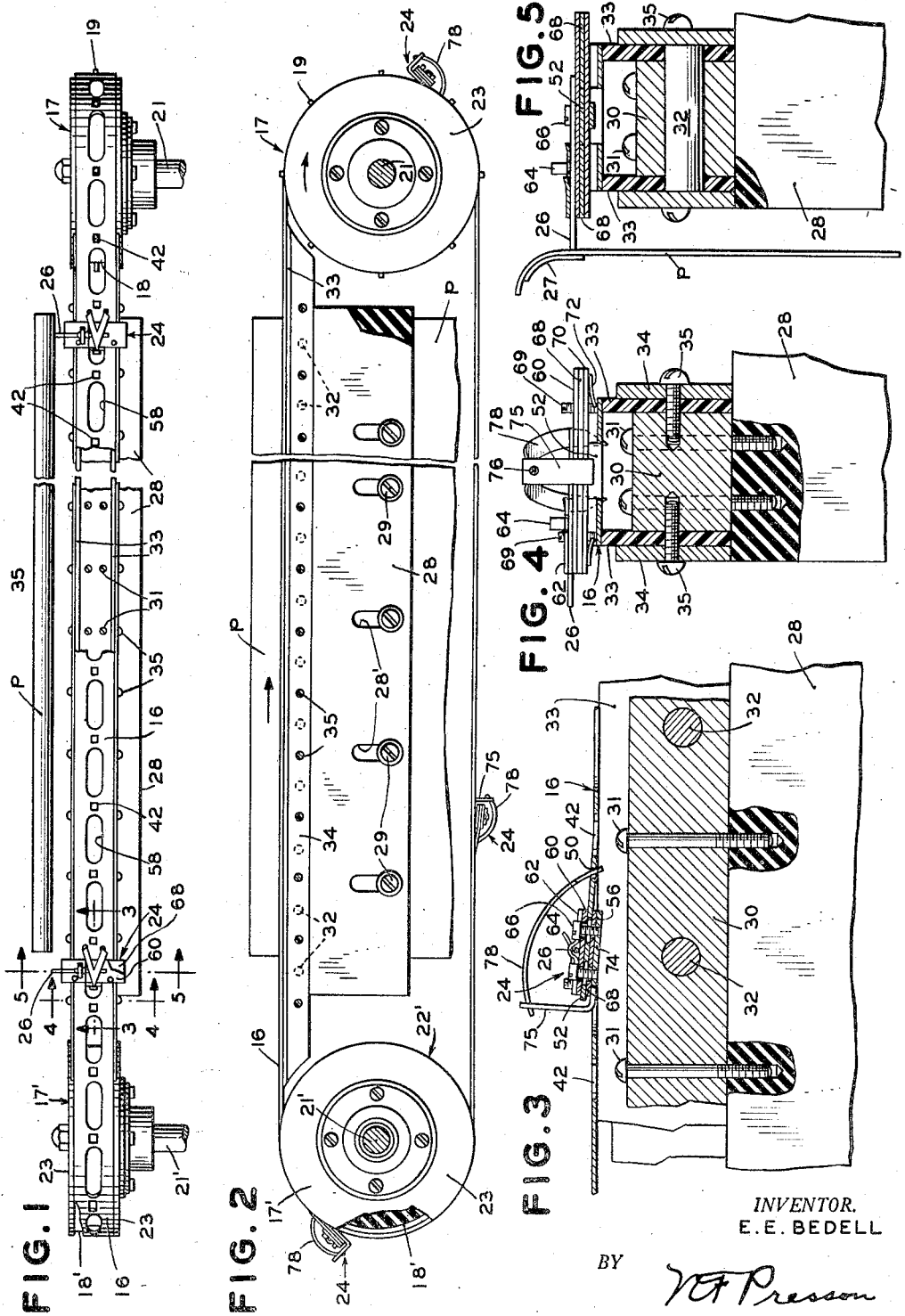
INVENTOR.
E. E. BEDELL
BY
ATTORNEY Sept. 23, 1958     E. E. BEDELL     2,853,358
FACSIMILE STYLUS BELT AND STYLUS HOLDER
Filed April 11, 1956     2 Sheets-Sheet 2
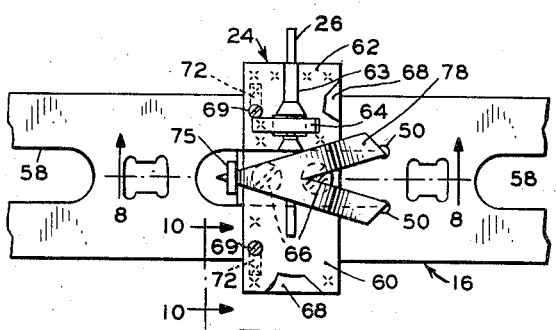
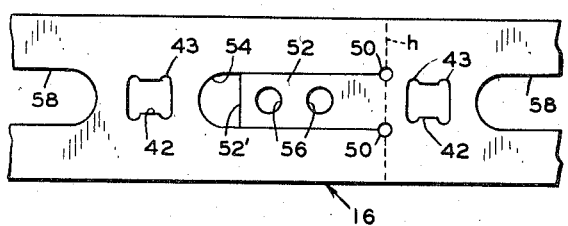
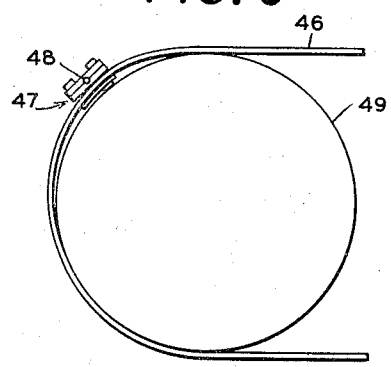
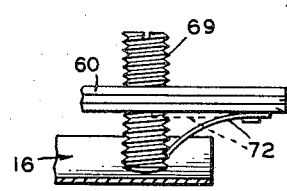
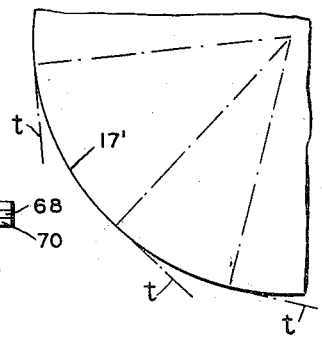
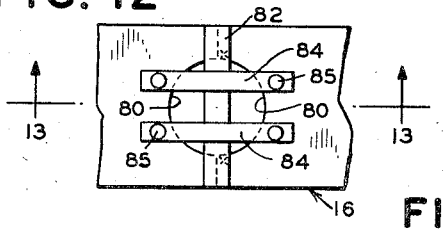
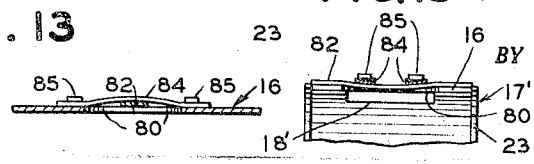
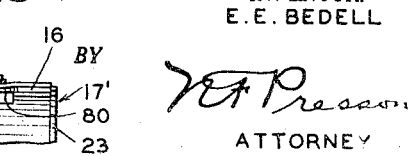
INVENTOR.
E. E. BEDELL
ATTORNEY

United States Patent Office 2,853,358
Patented Sept. 23, 1958

---

2,853,358

FACSIMILE STYLUS BELT AND STYLUS HOLDER

Elmer E. Bedell, Southampton, N. Y., assignor to The Western Union Telegraph Company, New York, N. Y., a corporation of New York Application April 11, 1956, Serial No. 577,562

14 Claims. (Cl. 346—139)

This invention relates to improvements in a facsimile stylus belt and stylus holders carried thereby for facsimile recorders, and more particularly to stylus recording structure in which a plurality of electrical styluses carried by a rotating steel belt successively traverse a sheet of recording paper at a scanning line position as the paper is advanced through the recorder.

Facsimile recording of messages is commonly effected on a continuous sheet of electrosensitive recording paper as it is advanced past a scanning line position. A plurality of electrical styli carried by and spaced along a moving steel belt traveling around pulleys, successively scan and mark the recording sheet at the scanning line position in accordance with the received facsimile intelligence signals.

Each of the styli is carried by a stylus holder which heretofore has been rigidly secured to the steel belt. Since the stylus holder has a comparatively rigid base, this inserts rigidity into the belt at this place and very materially reduces its flexibility. As each of the stylus holders passes around the supporting pulley at each end of the belt it causes a chord to be inserted in the belt and introduces a chordal disturbance in the stylus scanning system. This is because the chordal disturbance is communicated by the belt to the stylus intermediate the pulleys and which is marking at the time, and causes the stylus point to deviate from the straight recording line, resulting in uneven definition in the recorded copy. This undesirable effect, which is commonly referred to in the art as stylus "jitter," becomes increasingly noticeable at various points of resonance in the recording cycle.

In accordance with the instant invention, longitudinally extending strips, generally in the form of tongues, are formed in the flexible stylus belt intermediate the edges thereof, as by punching the central portion of the web of the belt, and the stylus holders respectively are secured to these tongues. The stylus belt ordinarily is composed of steel, but may also be composed of Phosphor bronze, beryllium copper or other suitable alloy, or even of a suitable plastic. Each tongue remains connected to the web of the belt only by an unpunched portion at one end, or base, of the tongue so as to provide a juncture line lying in the plane of the belt and extending transversely across the belt. Each stylus is carried by a stylus holder, and the stylus holder is mounted on and carried by the free end of a tongue. The stylus holder has portions thereof extending over the adjoining edge portions of the belt, but the tongue and stylus holder carried thereby do not affect the flexibility of the belt.

The tongue and its stylus holder remain at all times in a free position with respect to the plane of the belt and irrespective of whether the belt is flat or curved. The unpunched portion of the tab represents a hinge line of motion extending transversely across the belt so that the belt can flex freely in a curved path, as around a pulley, without being affected by the tongue or the stylus holder carried thereby, and without affecting the tongue and holder. In the specific embodiment illustrated herein, the tongue when traveling on a straight line portion of the path of the belt lies substantially in the plane of the belt, but there is no force acting upon the tongue to cause it to conform to any curvature of the belt; similarly, the tongue and stylus holder carried thereby exert no force on the belt that interferes with the curvature of the belt as it passes around a pulley. Thus in any position which the belt assumes in its excursion, including any transition from a straight to a curved path, or vice versa, the belt is not distorted by reason of the tongue and stylus holder so that there are no forces introduced which would tend to insert chordal disturbances in the belt. When the belt is passing around a pulley, due to the inherent stiffness of the material at the base of the tongue, the tongue and stylus holder will extend in a direction substantially tangential to the radius of the pulley at any point where the stylus holder is passing around the pulley.

It is necessary during the straight line recording path of each stylus required for marking, that the stylus point be held strictly to this path. In order to effect this, a curved spring member has one end thereof pivotally secured to the belt on the axis of the hinge line at the base of the tongue, the other end of the spring exerting a force on the stylus holder having a component acting in a direction perpendicular to the upper surface of the belt and holding the base of the stylus holder in contact with the upper surface of the belt so long as the stylus is traveling in the straight line recording path. This preserves the exact required position of the stylus holder and the stylus carried thereby during the straight line recording portion of the path of travel in each excursion of the belt. The fact that the spring is pivotally secured to the belt on the axis of the hinge line insures that no chordal disturbance will be introduced into the belt due to the spring member when the belt is passing around a pulley.

An object of the invention is to provide a facsimile multi-stylus recording belt system in which stylus jitter is substantially or completely eliminated.

Another object of the invention is to provide a facsimile stylus belt carrying recording styli in which the flexibility of the belt is not reduced or detrimentally affected by the stylus holders secured thereto or by the manner in which the adjoining ends of the belt are connected together.

A further object is to produce a stylus belt of the character described in which no chordal disturbances are introduced into the belt by reason of the stylus holders passing around a supporting pulley.

Still another object is the provision of novel and improved means for insuring that the styli carried by a stylus belt will not deviate from a desired straight line recording path.

An additional object is to provide fastening means for retaining the flexibility of a metallic stylus belt at the place where the ends of the belt are joined.

These and other objects and advantages of the invention will be apparent from the following description of an illustrative embodiment thereof, taken in connection with the accompanying drawings in which:

Fig. 1 is a plan view of a steel belt and stylus assembly embodying the principles of the instant invention;

Fig. 2 is a side view of the assembly of Fig. 1, showing the belt and styli in another scanning position;

Fig. 3 is an enlarged fragmentary sectional view of a stylus holder, taken along the line 3—3 of Fig. 1;

Fig. 4 is an enlarged sectional view taken along the line 4—4 of Fig. 1;

Fig. 5 is an enlarged sectional view taken along the line 5—5 of Fig. 1;

Fig. 6 is a fragmentary detailed plan view on an enlarged scale, of the belt and stylus holder;

Fig. 7 is a fragmentary view of the belt as fabricated for mounting a stylus holder;

Fig. 8 is an exploded view showing details of the clamping structure for mounting the stylus holder on the belt;

Fig. 9 illustrates how a chordal disturbance is introduced into a belt of a type heretofore employed;

Fig. 10 is a fragmentary detailed view of means for aligning a stylus carried by the holder shown in Fig. 6;

Fig. 11 is a geometric figure showing the tangential positions successively assumed by the stylus holder as it travels around a supporting pulley;

Fig. 12 is an enlarged view showing details of means for flexibly connecting together the abutting ends of the stylus belt;

Fig. 13 is a sectional view taken along the line 13—13 of Fig. 12;

Fig. 14 is a sectional view illustrating the principle involved in the flexible belt connection when the belt is passing around a pulley; and Fig. 15 is a cross-sectional view showing a desired deflection of certain of the connecting strips when the abutting ends of the belt are passing around a supporting pulley.

Referring for the moment to Fig. 9 of the drawings, the manner in which the chordal disturbances hereinabove referred to are introduced into a stylus belt of prior construction is diagrammatically illustrated. The belt, indicated by reference numeral 46, has secured thereto several stylus holders, one of which is designated at 47, and each carrying a recording stylus 48. Each stylus holder when secured to the belt in conventional manner renders the adjoining area of the belt relatively inflexible, and as the stylus holder passes around one of the pulleys 49 is distorts the belt 46 and produces a chord in the belt thus resulting in chordal disturbances introduced into the belt and transmitted as "jitter" to the scanning stylus system. The prior arrangement illustrated also imposes additional intermittent loads on the driving system for the belt due to the distortion introduced by such holders and thus tends to interfere with the smooth and uniform movement of the belt. These disturbances are eliminated in the scanning arrangement of the instant invention, and the flexibility of the stylus belt is unimpaired by reason of the stylus holders secured thereto, and also is unimpaired by reason of the manner in which the abutting ends of the steel belt are secured together, as will appear hereinafter.

Referring now to Figs. 1 and 2, there is shown an endless stylus belt 16 of flexible spring steel which is stretched over a drive pulley or sprocket 17 and an idler pulley 17'. The belt is driven in any suitable manner; in the embodiment illustrated this is effected by sprocket teeth 19 in the drive pulley 17, in the direction of the arrow as seen in Fig. 2. The drive pulley is rotated by a drive shaft 21 which in turn is driven at uniform speed by a synchronous motor in known manner. The idler pulley 17' does not have sprocket teeth, and flanges 23 thereon prevent any substantial side play of the belt. The belt carries a plurality of stylus holders 24 which are constructed and secured to the belt in a manner hereinafter described in detail. The drive pulley 17 does not require flanges because the sprocket teeth effect tracking of the belt. Both pulleys are undercut, as seen at 18 and 18' of Fig. 1, to provide clearance for the underside of the stylus holder assemblies 24. Each stylus holder carries an electrical recording stylus 26 of small diameter, for example, 0.008 inch; a short length of steel piano wire is commonly employed. The path of stylus travel during the upper transit of the belt 16, as seen in Fig. 2, causes the styli successively to traverse a sheet of recording paper $p$ which is fed from a supply roll and is advanced past the scanning line position at the proper rate relative to the rate of travel of the styli for scanning purposes. The recording paper at the scanning line position passes across a suitable platen member, such as indicated at 27 in Fig. 5, to provide a backing for the paper at the scanning line position where it is engaged by the styli in succession.

In Fig. 1 the stylus 26 shown at the right hand portion of the figure is leaving the scanning line position, while the stylus 26 shown at the left of the figure is about to enter the scanning line position; in Fig. 2 the belt 16 is shown as having advanced to a position in which two of the stylus holders 24 are passing around the pulleys, in order to show their angular positions relative to the belt and pulleys at such times, and the lower straight line portion of the belt shows a stylus holder in the position which it assumes when the belt is traveling in a straight line path.

Preferably, although not necessarily, the belt is held down magnetically during the straight line scanning portion of its path. A rigid bar 28 of nonmagnetic material, and preferably composed of Bakelite or other insulating material, is fixedly mounted in relation to the belt and pulleys by means of machine screws 29 seen in Fig. 2, which screws engage suitable supporting structure (not shown). Slots 28' provide for vertical adjustment of the bar 28. Secured to the bar 28, as by machine screws 31 seen in Figs. 3 to 5, is a bar 30 of nonmagnetic material, preferably brass, and this bar has holes or apertures drilled therein within which are inserted permanent bar magnets 32, seen in Figs. 3 and 5, which preferably are cylindrical in cross-section so as to facilitate the drilling operations. These magnets comprise magnetic material having high remanence. When constructed of a cast alloy containing cobalt, nickel and iron, the bar magnets may be relatively small in diameter, for example, ¼", and spaced at approximately 2" intervals, and are oriented in the same magnetic direction. The ends of the magnets 32 have bars 34 clamped thereto, as by machine screws 35 received within the brass bar 30. The bars 34 are formed from a suitable magnetizable material, for example, steel, and act as pole pieces of a long magnet, and therefore exert an attracting influence on the steel stylus belt to effect a magnetic hold-down action on the belt across the scanning line position. Intermediate the bars 34 and the brass bar 30 are two rails 33, frequently called grouping bars, on which the stylus belt travels across the scanning line position. These grouping bars are composed of nonmagnetic material, and preferably of a low-friction material such as molybdenum disulphide impregnated nylon which removes the need for lubrication and in which wear is negligible. The grouping bars are firmly clamped in the assembly by means of the machine screws 35, and the air gaps established by the bars 33 between the pole pieces 34 and the steel belt serve to prevent concentration of the flux field and render the force of magnetic attraction on the belt more evenly distributed. Since the belt rides the bars 33 over the length of the recording line with improved smoothness, the amount of hold-down force required to maintain accurate grouping is considerably lessened. The more even distribution of hold-down force also removes or minimizes magnetic zones, and of course permits the employment of other material than steel heretofore employed for grouping bars.

Preferably the feed holes 42 in the belt have a rectangular (usually square) configuration instead of the round holes commonly employed heretofore, which arrangement allows conventional involute sprocket teeth to engage a straight edge of the belt instead of a circular edge.

The manner in which the stylus holders are secured to the belt, and the improved characteristics of the belt and stylus holder, will be noted by reference to Figs.

6 to 11 of the drawings. In regard to the rectangular feed holes 42 in the belt, small holes indicated at 43 in Fig. 7 are drilled at the corners of each feed hole before it is cut or punched out in order to prevent tearing of the belt, after which the rectangular hole may safely be punched in the belt web. Small holes 50 are also drilled to prevent tearing of the web when the tongue 52 is punched in the web.

Each tongue 52 remains connected to the web of the belt only by he unpunched portion at the fixed end or base of the tongue, thus resulting in a juncture line lying in the plane of the belt and extending transversely across the belt in line with the holes 50, i. e., at a right angle to the longitudinal axis of the belt, as indicated by the dotted line $h$ seen in Fig. 7. The free end of the tongue 52 is partially cut off as indicated at 52' during the punching operation, leaving an apertured portion 54 between the remaining free end of the tongue and the adjacent web of the belt. Holes 56 are also drilled in the tongue for mounting the stylus holder as hereinafter described. The line $h$ indicates a transversely extending hinge line area between the belt and tongue so that the flexibility of the belt is not reduced or otherwise affected by the tongue or the stylus holder carried by the free end of the tongue. Elongated openings indicated at 58 in Figs. 1, 6 and 7 are also punched in the web to improve the uniformity of flexibility of the web and to prevent "oil-canning" or "snap-dishing" effects during operation.

Fig. 8 is an exploded view of the elements of the stylus holder prior to assembly. These elements comprise a stylus holder plate 60 having holes 61 therein for the reception of machine screws 66. A small plate 62 is formed to provide a funnel-shaped orifice or tube 63 for the stylus 26, the plate member 62 being spot-welded to the plate 60 as indicated by the small crosses in Fig. 6. The small plate 62 has secured thereto, as by spot welding, a flexible spring member 64 which is received within a slot in member 62 and applies resilient tension on the stylus 26 to hold it firmly in proper recording position. The plates 60 and 70 are secured to the tongue 52 and also to the base of a narrow L-shaped bracket member 74 by the machine screws 66 which thread into the base of the member 74. Two small spacer plates 68, Fig. 6, are interposed between the plates 60 and 70 at the ends thereof, and on either side of the tongue 52, to compensate for the thickness of the tongue; the plates 60, 68 and 70 are spot-welded together as indicated by small crosses. Two small flat spring strips 72 are each secured at one end thereof, as by spot-welding, to the underside of plate member 70 at the ends of the member, as seen in Figs. 6, 8 and 10. Two adjusting screws 69 pass through the plates 60 and 68 and are threaded into screw holes 71 in plate 70, and each is locked in an adjusted position by the free end of the adjacent spring 72 which enters a thread of the associated adjusting screw 69. The adjusting screws respectively bear upon the face of the opposite edge portions of the steel belt 16 in order to adjust the height of the stylus holder and also for leveling purposes, thereby providing an accurate means for aligning the vertical position of the recording end of the stylus with respect to the recording line position of the stylus belt system.

Member 78 is a V-shaped spring member having two legs, which spring member is flexed or bowed upwardly in the middle and the ends of the tapered points of its diverging legs inserted in and pivotally secured by the openings 50 in the belt, the V-shaped tapered point of the spring being inserted in and pivotally secured by an opening 76 in the upper end of the upright portion 75 of the L-shaped bracket 74, as seen in Figs. 3, 4 and 6. As hereinbefore set forth, it is necessary during the straight line recording path of each stylus that the stylus be held strictly to this path. The bowed spring member 78, which has the ends of the diverging legs thereof pivotally secured to the belt on the axis of the transverse hinge line area $h$ at the base of the tongue 52, exerts a component of force acting downwardly on the L-shaped member 74 and hence on the stylus holder 24, this force being just sufficient to cause the base 70 of the stylus holder assembly to be held down in contact with the upper surface of the belt, with the tongue 54 lying in the plane of the belt, so long as the stylus is traveling in the straight line recording path, and this accurately preserves the proper recording position of the stylus holder and the stylus carried thereby during each recording operation.

Due to the fact that the diverging ends of the legs of the bowed V-shaped spring 78 are pivotally secured in the holes 50 in the belt on the axis of the hinge line $h$, the tongue and stylus assembly carried thereby maintain a position which is substantially tangential to the surface of pulleys 17 and 17' when the adjoining portion of the belt is passing around the pulleys. The belt is free to flex at the hinge line and follow the curvature of the pulleys throughout the entire wrap-around portion, thereby avoiding the formation of chords and the introduction of any chordal disturbances in the belt and scanning system. This is diagrammatically shown in Fig. 11 by the tangential direction $t$ of the stylus holder at all points around a pulley 17 or 17' during the wrap-around of the stylus belt in its travel.

Figs. 12 to 15 show fastening means for retaining the flexibility of the stylus belt at the place where the abutting ends of the belt are joined. This is effected by means of a small transverse strap 82 of the same metal of which the belt is composed, which strap is spot-welded as indicated by the small crosses in Fig. 12 to one end of the belt, but the adjoining end of the belt is free to move so far as the strap 82 is concerned. Small steel straps 84 are fastened, as by rivets 85, to the abutting ends of the belt in order to provide greater flexibility of the belt at the ends. Fig. 13 shows the positions of the securing straps during a straight line portion of the travel of the belt. The central portion of the strap 82 is deflected downwardly into the aperture 80 by the configuration which the straps 84 assume when the ends of the belt are passing around a pulley, as will be seen in Figs. 14 and 15. With the arrangement shown the flexity of the belt at the juncture of its ends is substantially unimpaired and effects a smooth wrap-around of the belt at the ends thereof and comparable to the wrap-around effect of the other portions of the belt, so as to avoid the introduction of chordal or other disturbances in the belt.

Although the present invention has been described with reference to a specific embodiment thereof, it is understood that this is not to be considered as limiting the scope of the invention as defined by the appended claims.

What is claimed is:

1. In a facsimile machine for recording on a recording sheet or web, a scanning system including a stylus belt and spaced pulleys for supporting the belt, means for actuating the belt in a scanning path, a stylus holder affixed to said belt and carrying a stylus for traversing the recording sheet or web at a scanning line position, and means for preventing said stylus holder from introducing disturbances in the stylus belt when the stylus holder is passing around said pulleys, comprising a longitudinally extending tongue formed in, and from the material of, said belt intermediate the edges thereof, said tongue having all but a fixed end thereof free of the belt for relative movement from and towards the face of the belt, a stylus holder secured to and carried by said free portion of the tongue, said fixed end of said tongue being integral with the belt so as to form a hinge line in and extending transversely across the belt to enable the belt to freely flex with substantially equal facility around either of the pulleys at said hinge line portion of the belt.

2. The arrangement according to claim 1, in which the stylus belt is composed of spring steel, and said longitudinally extending tongue is formed by punching the free portion thereof from said belt.

3. The arrangement according to claim 1, in which the material of which the belt is composed has sufficient stiffness to cause the free portion of said tongue formed therein to assume a position substantially at a tangent to either pulley when the hinge line portion of the belt is passing around such pulley.

4. The arrangement according to claim 3, in which said stylus holder includes a plate member secured to the under face of the free portion of the tongue and extending over the opposite edge portions of the belt, a spring member and means for causing one end of the spring member to exert a component of force acting on the stylus holder in a direction to cause said plate member to remain in contact with the surface of the belt when the stylus is traversing the recording sheet or web at said scanning line position, the opposite end of the spring member being pivotally secured to the belt at said hinge line to cause the free portion of the tongue and the stylus holder carried thereby to assume a position away from the face of the belt when the hinge portion is passing around said pulleys.

5. The arrangement according to claim 4, in which the belt has small holes therein at said hinge line, and said opposite end of the spring member has points thereon received within said holes in the belt to pivotally secure the spring member at the hinge line.

6. The arrangement according to claim 4, including an upstanding bracket secured to said plate member of the stylus holder, said spring member being bowed outwardly from the face of the belt with one end thereof pivotally secured to the upper end of the bracket and the other end thereof pivotally secured to the belt at said hinge line.

7. In a facsimile machine for recording on a recording sheet or web, a scanning system including a multi-stylus belt and spaced pulleys for supporting the belt, means for actuating the belt in a scanning path, a plurality of stylus holders affixed to said belt at spaced intervals and each carrying a stylus for traversing the recording sheet or web at a scanning line position, and means for preventing said stylus holders from introducing disturbances in the stylus belt when the stylus holders are passing around said pulleys, comprising longitudinally extending tongues at said spaced intervals and each formed in, and from the material of, said belt intermediate the edges thereof, said tongues each having all but a fixed end thereof free of the belt for relative movement from and towards the face of the belt, a stylus holder secured to and carried by said free portion of each tongue, said fixed end of each tongue being integral with the belt so as to form a hinge line in and extending transversely across the belt to enable the belt to freely flex with substantially equal facility around either of the pulleys at each hinge line portion of the belt.

8. The arrangement according to claim 7, in which each tongue lies substantially in the plane of the belt except when the stylus holder secured to such tongue is passing around either of the pulleys.

9. The arrangement according to claim 7, in which said belt has longitudinally extending apertured portions therein at spaced intervals intermediate the stylus holders to cause the flexibility of the portions of the belt intermediate the stylus holders to have a value comparable to that which obtains at the portions of the belt occupied by said tongues.

10. In a facsimile machine for recording on a recording sheet or web, a scanning system including a stylus belt and spaced pulleys for supporting the belt, said belt being composed of a flexible spring metal strip having the ends thereof in abutting relation, means for actuating the belt in a scanning path, a stylus holder affixed to said belt and carrying a stylus for traversing the recording sheet or web at a scanning line position, and means for preventing said stylus holder and said abutting ends of the belt from introducing disturbances in the stylus belt when the stylus holder and said abutting ends are passing around said pulleys, comprising a longitudinally extending tongue forming an integral part of said belt intermediate the edges thereof, said tongue having all but a fixed end thereof free of the belt for relative movement from and towards the face of the belt, a stylus holder secured to and carried by said free portion of the tongue, said fixed end of said tongue being integral with the belt so as to form a hinge line in and extending transversely across the belt, said abutting ends of the belt having an aperture therein, and means for securing the abutting ends together comprising a first strip of flexible spring metal extending transversely across the belt and said aperture and secured to one of the abutting ends and overlying the other end, and at least one strip of flexible spring metal extending longitudinally along the belt and across said aperture, the ends of the last named strip respectively being secured to the abutting end portions of the belt for holding the ends together, said last named strip extending across said aperture and transversely across said first named strip, thereby to enable the belt to freely flex with equal facility around either of the pulleys at said hinge line portion and at said abutting ends of the belt.

11. A facsimile stylus belt assembly for traversing a recording sheet or web at a scanning line position, comprising a belt and a stylus holder affixed to said belt for carrying a recording stylus, a longitudinally extending tongue formed in, and from the material of, said belt intermediate the edges thereof and lying substantially in the plane of the belt when the adjacent portion of the belt is not flexed, said tongue having all but a fixed end thereof free of the belt, said fixed end of the tongue being integral with the belt so as to form a hinge line in and extending transversely across the belt to enable the belt to freely flex with substantially equal facility at said hinge line portion, said stylus holder being secured to the free portion of said tongue.

12. A stylus belt assembly according to claim 11, in which the stylus holder includes a plate member secured to the free portion of the tongue and extending over the opposite edge portions of the belt, and adjusting screws extending through said plate member and bearing on the face of said opposite edge portions of the belt for adjusting the angular portion of the plate member relative to the belt to effect proper stylus tracking alignment.

13. A facsimile stylus belt adapted to carry a stylus holder and stylus and to travel around spaced pulleys to cause the stylus to traverse a recording sheet or web at a scanning line position, said belt being composed of a flexible spring metal strip having the ends thereof in abutting relation, said abutting ends having an aperture therein, and means for securing the abutting ends together comprising a first strip of flexible spring metal extending transversely across said belt and aperture and secured to one of the abutting ends of the belt and overlapping the other end thereof, and at least one strip of flexible spring metal extending longitudinally along said belt and across said aperture, the ends of the last named strip respectively being secured to the abutting end portions of the belt for holding the ends together, said last named strip extending across said aperture and transversely across said first named strip.

14. A facsimile stylus belt adapted to carry a stylus holder and stylus and to travel around spaced pulleys to cause the stylus to traverse a recording sheet or web at a scanning line position, said belt being composed of a flexible spring metal strip having the ends thereof in abutting relation, said ends respectively having matching apertured portions therein intermediate the edges of the end portions of the strip and extending to the ends to form an aperture common to the abutting end portions, and means for securing the abutting ends together comprising a narrow strip of flexible spring metal extending transversely across said belt and said aperture and overlapping the abutting ends of the belt, said strip being secured to only one of said abutting ends, and a plurality of narrow strips of flexible spring metal extending longitudinally along said belt and across said aperture, the ends of the last named strips respectively being secured to said abutting end portions for holding the ends together, said strips extending transversely across said first named strip and operative to flex the central portion of the first strip into said aperture when that portion of the belt is passing around either of said pulleys.

References Cited in the file of this patent

UNITED STATES PATENTS

| | | |
|---|---|---|
| 1,836,153 | Capps | Dec. 15, 1931 |
| 2,613,124 | Cooley et al. | Oct. 7, 1952 |
| 2,639,211 | Hallden et al. | May 19, 1953 |
| 2,715,055 | Fryklund | Aug. 9, 1955 |
| 2,718,450 | Leonard et al. | Sept. 20, 1955 |
| 2,798,120 | Sabol | July 2, 1957 |

FOREIGN PATENTS

| | | |
|---|---|---|
| 825,751 | Germany | Dec. 20, 1951 |